Figure 1:
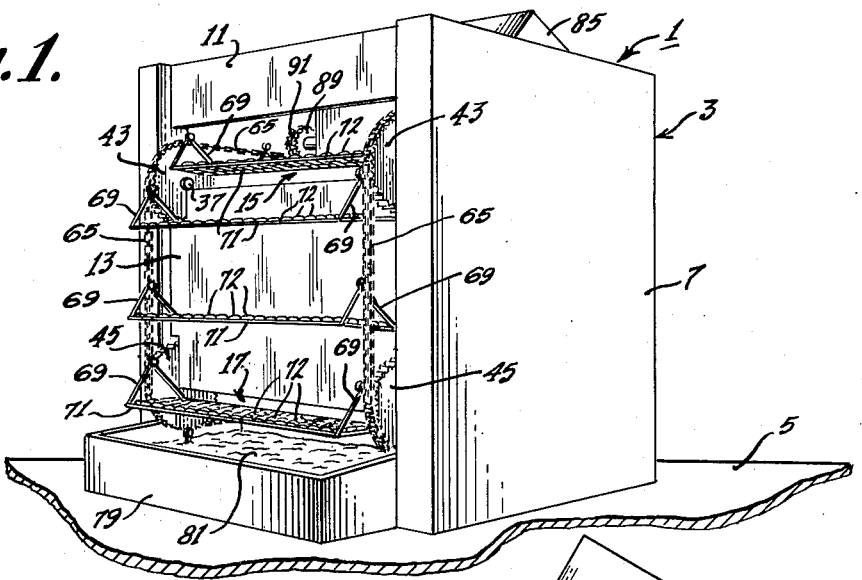

March 27, 1962 W. R. REACH 3,026,824
APPARATUS FOR BAKING EDIBLE PRODUCTS
Filed March 17, 1960 2 Sheets-Sheet 1

INVENTOR.
Walter R. Reach
BY
ATTORNEY.

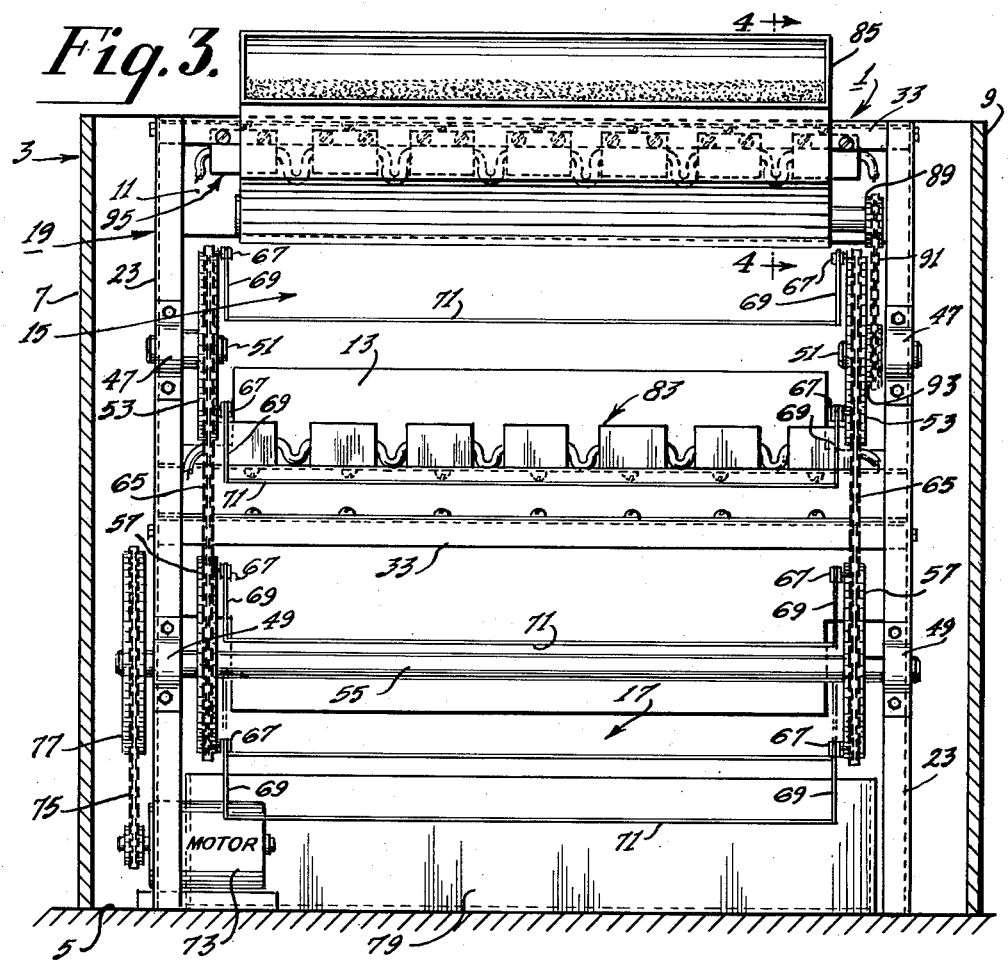

United States Patent Office 3,026,824
Patented Mar. 27, 1962

3,026,824
APPARATUS FOR BAKING EDIBLE PRODUCTS
Walter R. Reach, 570 Walnut St., Audubon, N.J.
Filed Mar. 17, 1960, Ser. No. 15,736
6 Claims. (Cl. 107—57)

This invention relates to apparatus for and a method of baking edible products made of dough, and more particularly to apparatus for and a method of baking soft pretzels or the like from frozen dough and preparing such pretzels or the like for immediate vending.

According to the prevailing practice of preparing so-called soft pretzels for the commercial market, the pretzels are formed out of dough by professional pretzel twisters, after which they are subjected to treatment with a hot caustic solution and then baked by a professional baker in conventional ovens. This practice not only requires skilled and expensive professional personnel, as well as expensive equipment, if a good product is to be obtained, but also is relatively time consuming. Moreover, since the bakers in small establishments are kept constantly busy attending to the baking procedure, such establishments must employ one or more other persons either as salespeople or to deliver the baked pretzels to various sales outlets, usually small vendors some of whom operate in the open at portable stands where the pretzels are sold. The employment of such additional persons adds further to the cost of operation.

It is, of course, desirable to sell the pretzels while they are fresh, and preferably still warm. Since soft pretzels do not retain desired consistency and freshness very long, it is not practical to store baked pretzels of this type for extended periods. To assure at least a fair degree of freshness under prior practices, it has been customary to make frequent deliveries from the bakeries where the pretzels are baked to the various sales outlets. This adds still further to the cost of the baked pretzels and often results in waste when surplus pretzels have reached a state where they are unattractive to prospective purchasers.

The primary object of the present invention is to provide improved apparatus for, and an improved method of, baking edible products made of dough, such as soft pretzels, and preparing such products for vending immediately after baking, which apparatus and method will be free from the aforementioned and other disadvantages found in customary apparatus and methods heretofore employed.

More particularly, it is an object of this invention to provide improved apparatus for, and an improved method of, baking and vending pretzels of the soft type with the aid of but a single attendant and in a minimum of time, the apparatus and method being such as to enable the same attendant to attend to both the baking and the vending of the pretzels with ease.

Another object of the present invention is to provide improved apparatus for, and an improved method of, baking soft pretzels from frozen dough.

Still another object of this invention is to provide an improved apparatus and method as aforesaid which are automatic in operation once the apparatus has been loaded with unbaked pretzels or other, similar, edible products.

A further object of this invention is to provide an improved apparatus and method as above set forth which will always provide a uniform product from a given batch of dough.

Still a further object of this invention is to provide improved baking apparatus as set forth above which occupies a minimum of space and which can be used indoors without the need for providing venting of heat or of fumes from the caustic solution.

Yet another object of the present invention is to provide an improved method of baking frozen pretzels of the soft type whereby a cold caustic solution can be employed in which the pretzels are dipped, thereby eliminating the nuisance and danger of noxious fumes such as characterize prior practices wherein hot caustic solutions are employed.

Still another object of this invention is to provide improved apparatus for baking edible products of dough such that it can be operated efficiently even by an unskilled person.

It is also an object of this invention to provide improved apparatus for, and an improved method of, baking edible products as above set forth which are rapid in operation, which will result in better products because they will not cause such products to become dehydrated, and which are highly efficient in use.

In accordance with this invention, there is provided a relatively small oven having an exposed loading and unloading station at the front and a plurality of operating zones within it through which the unbaked products are passed successively by an endless conveyor. This conveyor, in one form, comprises a pair of endless sprocket chains arranged along the two opposed sides of the oven to travel in vertical planes and having pivotally mounted thereon, between them, a plurality of horizontally disposed trays. Frozen pretzels or similar products made of dough are loaded on each of these trays by a single operator as the trays arrive at the aforesaid loading station. The moving sprocket chains then advance the successive, loaded trays through the oven at a continuous and uniform rate, first to a dip tank at the lower, front end of the oven where the loaded pretzels are dipped in a cold, caustic liquid. The use of cold caustic liquid rather than hot caustic liquid, as in the prior art, avoids the nuisance of caustic vapors and the need for venting such vapors. From the dipping zone, the sprocket chains carry the dipped pretzels generally rearwardly through a proving zone along the lower part of the oven where heat is applied to the pretzels to more or less thaw them out and cause the dough of which they are made to rise. The continuously moving sprocket chains then carry the proved pretzels upwardly and through another zone at the upper, rear part of the oven where coarse salt is sprayed onto the pretzels, and then forwardly along the upper part of the oven through a baking zone where the pretzels are baked. Finally, the baked pretzels are returned by the endless sprocket conveyor to the station at the front of the oven where the operator unloads them in readiness for immediate vending and where the emptied trays can be reloaded with a fresh supply of unbaked, frozen pretzels or the like.

An oven such as described can be quite compact and will occupy a floor space which is minimum, and much smaller than that required by conventional ovens heretofore in use. When the oven is placed behind a counter, the sole operator can stand between the oven and the counter and not only attend to the oven, but also vend the freshly baked pretzels or the like over the counter without being taxed, inasmuch as the operation of the oven is automatic, once the unbaked products are loaded onto the trays. Since the operation of the oven is automatic, by properly timing the operation and by proper heat control, uniform products will always be obtained for a given batch of dough. The raw or unbaked, frozen products can be stored in a freezer under or alongside the oven and used as needed. This can be determined by the rate at which the baked products are dispensed or sold. Since this is under the control of the operator, freshly baked products ready for vending immediately after baking will be assured.

Figure 2:
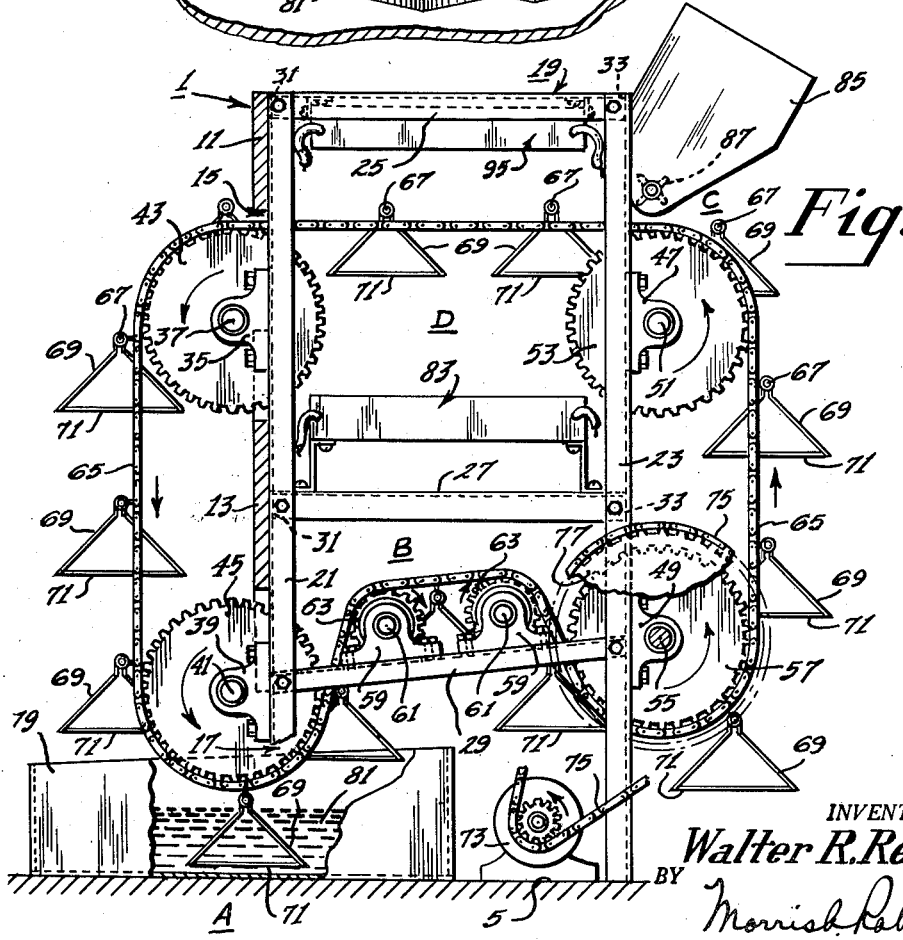

The novel features of the present invention, both as to its organization and method of operation, as well as additional objects and advantages thereof, will be understood more readily from the following description, when read in connection with the accompanying drawings in which FIGURE 1 is a front, perspective view of one form of oven according to the present invention, FIGURE 2 is a side elevation thereof, partly broken away and partly in section, as seen from the near side of FIGURE 1 and with the casing thereof removed, FIGURE 3 is a rear elevation thereof, also with the casing removed, and FIGURE 4 is a fragmentary, sectional detail taken along the line 4—4 of FIGURE 3.

Referring more particularly to the drawings, there is shown an oven 1 having a casing 3 supported on a base 5 and including side walls 7 and 9, and a front wall comprised of a pair of panels 11 and 13. The panel 11 is disposed adjacent to the top of the oven. The panel 13 is spaced from the panel 11 to provide an exit opening 15 and terminate short of the base 5 to provide an entrance opening 17 for a purpose presently to be set forth.

Within the casing 3 is a frame 19 having pairs of opposed front uprights 21 and rear uprights 23, and pairs of opposed top side members 25, intermediate side members 27, and lower side members 29 connecting the respective front and rear uprights 21 and 23 to each other on each side of the oven. The frame 19 also has a pair of front cross members 31 and a pair of rear cross members 33 which respectively connect the two front uprights 21 and the two rear uprights 23 to each other at the top and at about the middle of the oven. If desired, a top or cover (not shown) having louvres therein, and a pivoted or easily removable back wall (not shown) may also be provided at the top and rear of the casing 3 to completely enclose the frame 19.

Mounted on the front uprights 21 along the upper parts thereof are a pair of horizontally aligned journal blocks 35 in which a pair of axially aligned stub shafts 37 are journaled. A similar pair of horizontally aligned journal blocks 39, mounted on the front uprights 21 near the lower ends thereof, carries a pair of axially aligned stub shafts 41. Secured to each stub shaft 37 is a gear 43 for rotation therewith; and similarly secured to each stub shaft 41 is a gear 45. The gears 43 and 45 may be of the same size, the two sets of gears 43 and 45, one set on each side of the oven, being disposed in common, vertical planes. The rear uprights 23 also have mounted thereon upper and lower horizontally aligned pairs of journal blocks 47 and 49 corresponding to the blocks 35 and 39, respectively. The upper journal blocks 47 have journaled therein a pair of axially aligned stub shafts 51 to each of which is secured a gear 53 for rotation therewith. An elongated shaft 55 is journaled in the blocks 49 and has fixed thereto a pair of gears 57, one near each block 49. The gears 53 and 57 may be of the same size as the gears 43 and 45. In any case, there is provided along each side of the oven 1 a set of gears 43, 45, 53 and 57, the gears of each set being disposed in a common, vertical plane.

Slidably mounted on each lower side member 29 of the frame 19 for relative adjustment therealong are a pair of journal blocks 59, each having journaled therein a stub shaft 61 to which a gear 63 is secured. The blocks can be locked in desired positions on the members 29 by means of bolts passing through slots in the blocks and threaded into the members 29. Around each set of gears 43, 45, 53, 57, and 63, 63 is trained an endless sprocket link chain 65 in a vertical plane. Suitable tension is maintained in the chains 65 by adjustment of the blocks 59 along their respective mounting members 29.

The two endless chains 65 have secured thereto, at suitably spaced points, oppositely disposed and horizontally axially aligned, headed pins 67 each of which loosely pivotally carries a triangular, depending, wire bail 69. Opposed pairs of bails are horizontally aligned and are secured, at their bases, to platforms 71 which are preferably foraminous. The respective pairs of bails and their attached platform constitute trays on which the products 72 to be baked can be loaded and from which the baked products can be removed; and the endless chains 65, together with the respective trays carried thereby, constitute an endless conveyor for advancing the products into the oven, through several operating zones therein, and then back out of the oven in a predetermined direction along an endless path about to be described. During this time, the platforms 71 always remain horizontal by reason of the pivotal mounting of their bails 69 on the pins 67.

The endless conveyor is driven by a motor 73 through a link chain 75 and a gear 77 secured to the shaft 55. The conveyor is driven in such a direction that the trays 69, 71, 69 are moved downwardly in front of the panel 13 which may be considered as a loading and unloading station. Here, the operator loads the frozen pretzels or other, similar, unbaked dough products onto the trays.

Extending partially out of the oven casing 3 through the opening 17 at a zone A, and resting on the base 5, is a tank 79 in which a liquid 81 is stored to give the unbaked products 72 an initial treatment preparatory to baking thereof. In the case of frozen, soft-type pretzels, the liquid 81 is a cold caustic solution of the sort well known to pretzel bakers. As the chains 65 pass around the lowermost portions of the gears 45, they bring the successive trays loaded with unbaked products into the oven through the entrance opening 17 and down into the tank 79 to cause the unbaked products to be dipped into the liquid 81.

It will be noted that the gears 63 are at a higher elevation than the gears 45. Hence, as the chains 65 leave the gears 45, they raise the trays up out of the tank 79 to permit excess liquid to drain off and to raise the dipped products into a proving zone B under a bank of heating units 83 mounted on the intermediate side members 27 of the frame 19. Heat from the heating units 83 helps the frozen products to thaw out and the dough thereof to rise.

Continued advance of the chains 65 carries the loaded trays and their proved products 72 generally rearwardly through the lower portion of the oven, and then upwardly along the rear thereof to a salting zone C. Here, there is mounted on the frame 19, at the rear, upper end thereof, a salt hopper 85 in which is rotatably carried a paddle roller 87. The roller 87 extends out beyond one side of the hopper 85 and has a gear 89 thereon which is coupled by a link chain 91 to a gear 93 secured to one of the stub shafts 51. The bottom of the hopper 85 is perforated to permit coarse salt crystals in the hopper to pass therethrough. As the conveyor chains 65 move forward, they cause the paddle roller 87 to rotate and thus to deposit salt on the proofed products 72 which are now ready to be baked.

Baking of these products is accomplished in a zone D in the upper half of the oven between the bank of heaters 83 and a cooperating, upper bank of heaters 95 mounted on the top side members 25 of the frame 19. These heaters may be of the infra-red type, or any other suitable type. Throughout the entire movement of the edible products 72 through the oven, they are advanced continuously and at a uniform rate successively through the zones A, B, C and D. This rate is such that, considering the nature of the products and the temperature in the baking zone D, the products 72 will have been baked precisely as required by the time they have passed through the baking zone. As the trays and their baked products leave the zone D, they are passed through the exit opening 15 and thence down along the front panel 13 through the loading-unloading station where the operator unloads the freshly baked products. These products can then be immediately vended or otherwise dispensed by the same operator.

From the foregoing description, it will be apparent that I have provided improved baking apparatus for baking edible dough products, as well as an improved method of baking such products directly from the frozen state. Such apparatus and method have been found to produce highly satisfactory products by a single (even unskilled) operator in one-third of the time required by the use of prior art apparatus and methods. Moreover the improved apparatus and method of the present invention not only provide a better product because, with increased speed of operation, the products do not become as dehydrated as with prior art apparatus and methods, but they also provide consistently uniform products. In addition, the present invention readily permits "on the spot" baking to suit varying demands and to assure freshness at all times. Also, the present invention permits storing the unbaked products in frozen form in a freezer handily located, ready to be used as and when needed. Thus, waste normally resulting from unused, baked products for which there has been no demand is entirely eliminated.

From the foregoing description and the accompanying drawings, wherein but a single embodiment of my present invention has been disclosed, it will also be apparent to those skilled in the art that other forms thereof, as well as variations in those herein described which fall within the spirit of this invention, are possible. Hence, I desire that the foregoing shall be taken merely as illustrative and not in a limiting sense.

I claim as my invention:

1. Apparatus for baking frozen, soft pretzels comprising an oven having a wall in front of which is a station at which said pretzels can be loaded in the frozen state and unloaded in the baked state and also having a plurality of operating zones including a baking zone, endless conveyor means in said oven movable out of and back into said oven in a path along the front of said wall through said station for receiving said frozen pretzels at said station and carrying them successively through said operating zones in a certain direction and eventually back to said station for unloading thereof, means for driving said endless conveyor means whereby to advance the pretzels loaded thereon successively through said zones in said direction, means at a first of said zones including a tank in proximity to said wall for subjecting the frozen pretzels loaded on said conveyor means to a treatment with a cold caustic liquid while said pretzels are still frozen, means at a succeeding one of said zones in said direction for subjecting said liquid-treated pretzels to proving action, means at another succeeding one of said zones for applying salt to said proved pretzels, and means at said baking zone for baking said salted pretzels.

2. Apparatus for baking frozen, soft pretzels comprising an oven having a wall in front of which is a station at which said pretzels can be loaded in the frozen state and unloaded in the baked state and also having a plurality of operating zones including a baking zone, endless conveyor means in said oven movable out of and back into said oven in a path along the front of said wall through said station for receiving said frozen pretzels at said station and carrying them successively through said operating zones in a certain direction and eventually back to said station for unloading thereof, means for driving said endless conveyor means whereby to advance the pretzels loaded thereon successively through said zones in said direction, a dip tank at a first of said zones for a cold caustic liquid with which said pretzels are to be initially treated following loading thereof on said conveyor means, means for causing said conveyor means to effect dipping of said loaded pretzels into said dip tank while said pretzels are still frozen whereby to subject said frozen pretzels to treatment by the liquid in said tank, means at a succeeding one of said zones in said direction for subjecting said dipped pretzels to proving action, means at another succeeding one of said zones for sprinkling salt onto said proved pretzels, said baking zone following said salt sprinkling zone in said direction, and means at said baking zone for baking said salted pretzels.

3. Apparatus according to claim 2 wherein said salt sprinkling means comprises a perforated container for containing salt crystals, and means in said container for agitating said salt crystals whereby to cause said crystals to pass through the perforations in said container and onto the surfaces of said proved pretzels.

4. Apparatus for making edible products made of dough comprising an oven having a casing which includes a front wall and a station located in front of said front wall at which said products can be loaded in the unbaked state and unloaded in the baked state, said oven also having a plurality of discrete operating zones within said casing including a liquid treatment zone at the lower, front portion of said oven, a proving zone in the lower region of said oven between the front and the rear of said casing, a salt treatment zone at the upper, rear portion of said oven, and a baking zone at the upper portion of said oven between the rear and the front of said casing, endless conveyor means in said oven for receiving said unbaked products at said station and carrying said products successively through said operating zones in a direction in the named order of said zones and thence back to said station for unloading thereof, said endless conveyor means comprising a pair of endless chains disposed in vertical planes adjacent to the opposite sides of said casing and a plurality of trays pivotally carried by said chains, said trays being disposed horizontally between said chains at all times while being advanced by said chains by reason of the pivotal mounting thereof and being adapted to receive said edible products at said station, means for driving said endless conveyor means, means housed within said casing at those of said discrete zones in advance of said baking zone in said direction for conditioning said loaded products preparatory to baking thereof to ready them for baking, said last named means including a dip tank at said liquid treatment zone for reception of a liquid in which said edible products will be dipped as said trays are moved through said liquid treatment zone, and means at said baking zone for baking said products, said baking zone being located immediately ahead of said station in said direction whereby said conveyor means carries said baked products from said baking zone directly back to said station for unloading of said baked products thereat.

5. Apparatus for baking edible products made of dough comprising an oven having a casing which includes a front wall, said front wall having entrance and exit openings therein for passage of said products respectively in the unbaked state into and in the baked state out of said casing, the area in front of said casing front wall between said entrance opening and said exit opening constituting a station in front of said front wall at which said products can be loaded in the unbaked state and from which they can be removed in the baked state, said oven also having a plurality of discrete product treating zones within said casing, endless conveyor means mounted in said oven for movement along a path from said station into said casing through said entrance opening and thence through said discrete product treating zones in succession and finally through said exit opening back to said station, said endless conveyor means including supports for receiving said products at said station, means for driving said conveyor means along said path whereby said supports will carry the products received thereon at said station along said endless path, a dip tank for receiving a liquid with which to initially treat said products on said supports, said dip tank being disposed at a first of said zones and partly extending out from within said casing at said entrance opening, means for causing said supports to be brought successively into dipping relation with said tank as said conveyor means enters into said casing through said entrance opening whereby to cause the products carried on the respective said supports to be immersed in the liquid contained in said tank, means for thereafter withdrawing said immersed products carrying supports from said tank to thereby remove said immersed products from said liquid, means at the next succeeding and second one of said zones for thereafter subjecting said removed products to an initial heat treatment as said products are advanced therethrough, means at the next succeeding and third one of said zones for applying a superficial layer of material on said initially heated products as they continue to be advanced through said third zone, and heating means at the next succeeding and fourth one of said zones for then baking said products during the further advance thereof through said fourth zone, said exit opening being located immediately beyond said fourth zone in the direction of movement of said conveyor means, said conveyor means being disposed to pass said supports from said fourth zone directly back to said station whereby to expose said products for removal thereof from their respective supports.

6. Apparatus according to claim 5 wherein said entrance opening is adjacent to the lower end of said front wall and said exit opening is adjacent to the upper end of said front wall, and wherein said endless conveyor is driven in a direction such that said supports are moved downwardly along said front wall toward said dip tank.

References Cited in the file of this patent

UNITED STATES PATENTS

| | | |
|---|---|---|
| 229,320 | Lampert | June 29, 1880 |
| 1,290,193 | Hicks | Jan. 7, 1919 |
| 1,359,247 | Haller | Nov. 16, 1920 |
| 1,363,781 | Haller | Dec. 28, 1920 |
| 1,414,439 | Snyder | May 2, 1922 |
| 1,686,596 | Betz | Oct. 9, 1928 |
| 1,751,312 | Ehrhart | Mar. 18, 1930 |
| 1,759,608 | Ehrhart | May 20, 1930 |
| 2,119,910 | Ferry | June 7, 1938 |
| 2,549,595 | Gregor | Apr. 17, 1951 |
| 2,650,553 | Dornbush | Sept. 1, 1953 |
| 2,780,182 | Rand | Feb. 5, 1957 |